(12) United States Patent
Kumar et al.

(10) Patent No.: US 9,680,996 B2
(45) Date of Patent: Jun. 13, 2017

(54) METHOD AND APPARATUS FOR SCHEDULING CALLBACKS VIA OFFLINE OFFER TASKS TO KNOWLEDGE WORKERS

(75) Inventors: Sanjeev Kumar, Sunnyvale, CA (US); Mukul Jain, San Jose, CA (US); Shmuel Shaffer, Palo Alto, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2316 days.

(21) Appl. No.: 12/174,073

(22) Filed: Jul. 16, 2008

(65) Prior Publication Data

US 2010/0014653 A1    Jan. 21, 2010

(51) Int. Cl.
*H04M 3/51* (2006.01)
*H04M 3/42* (2006.01)

(52) U.S. Cl.
CPC ...... *H04M 3/5191* (2013.01); *H04M 3/42195* (2013.01)

(58) Field of Classification Search
CPC .................. H04M 3/5233; H04M 2203/402
USPC ............ 379/265.11–265.12, 210.01, 265.01, 379/265.02, 265.04, 265.05, 265.06
See application file for complete search history.

(56) References Cited

U.S. PATENT DOCUMENTS

| | | | |
|---|---|---|---|
| 5,862,223 A * | 1/1999 | Walker et al. ................ 705/50 |
| 7,773,740 B2 * | 8/2010 | Beckstrom et al. ..... 379/265.13 |
| 2003/0126205 A1 * | 7/2003 | Lurie ........................... 709/204 |
| 2004/0143476 A1 * | 7/2004 | Kapadia et al. ................. 705/9 |
| 2006/0093123 A1 * | 5/2006 | Becerra et al. .......... 379/265.01 |
| 2006/0126818 A1 * | 6/2006 | Berger et al. ........... 379/265.09 |
| 2006/0167729 A1 * | 7/2006 | Rafter et al. ..................... 705/8 |
| 2006/0256949 A1 * | 11/2006 | Noble, Jr. ................ 379/265.01 |
| 2007/0274495 A1 * | 11/2007 | Youd et al. .............. 379/210.01 |
| 2007/0280460 A1 * | 12/2007 | Harris et al. ............. 379/201.01 |
| 2008/0196035 A1 * | 8/2008 | Davoust et al. ............. 718/104 |
| 2008/0205630 A1 * | 8/2008 | Deshpande ............. 379/266.01 |
| 2009/0261157 A1 * | 10/2009 | Kumar et al. ................ 235/375 |

* cited by examiner

*Primary Examiner* — Nafiz E Hoque
(74) *Attorney, Agent, or Firm* — P. Su

(57) ABSTRACT

In one embodiment, a method includes a request that is obtained by a call center system from a customer. The method also includes identifying a first set of experts that includes at least a first expert suitable for, or capable of, processing the request. The first expert is offline with respect to the call center system. An offer task is created and provided to the first set of experts. The offer task identifies the request and initiates the scheduling of a callback to address the request.

10 Claims, 15 Drawing Sheets

METHOD AND APPARATUS FOR SCHEDULING CALLBACKS VIA OFFLINE OFFER TASKS TO KNOWLEDGE WORKERS

BACKGROUND OF THE INVENTION

The present invention relates generally to communications systems.

Callers to customer call centers are not always able to reach an appropriate agent, e.g., an appropriate expert or knowledge worker, to respond to their questions. By way of example, a caller may call a customer call center with a question regarding a particular area for which there is no appropriate expert on duty or effectively answering calls. Typically, if no appropriate expert is on duty, a customer call center system will find a set of appropriate experts who are online, e.g., logged into to the customer call center system or present within the customer call center system using an instant messaging application, and send the set of appropriate experts an "offer task" message. The "offer task" message generally informs the set of appropriate experts who are online that there is a customer call available for which the appropriate experts are particularly suitable for responding. When one of the appropriate experts accepts the offered task and, hence, agrees to respond to the customer call, the other appropriate experts are notified that the offered task has been accepted by another party.

In the event that there is no set of appropriate experts online when a customer call comes into a customer call center, the customer call center system generally either informs the customer to call back at another time, or routes the customer call to an agent who may not have the expertise sought by the customer. Such a solution may be undesirable, as there is no guarantee that the customer will have more success with finding an appropriate agent when he or she calls back, and an agent without the appropriate expertise may not be capable of providing the necessary assistance to the customer.

Often, a customer who calls a customer call center may require assistance from more than one agent. By way of example, a customer may require the services of a subject-matter expert and a foreign language translator. If only one agent whose expertise is needed by the customer is available to respond to a call placed by the customer who requires the services of two or more experts, an offer task message may be sent to a set of appropriate experts who are not currently available. However, when the offer task message is accepted, the first expert may not necessarily still be available. Hence, the customer may still be unable to receive satisfactory assistance.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes a request that is obtained by a call center system from a customer. The method also includes identifying a first set of experts that includes at least a first expert suitable for, or capable of, processing the request. The first expert is offline with respect to the call center system. An offer task is created and provided to the first set of experts. The offer task identifies the request and initiates the scheduling of a callback to address the request.

Description

Using substantially asynchronous communication modalities to send "offer tasks," or requests to respond to calls into a call center, to offline experts or knowledge workers enables the offline experts to accept the offer tasks and plan to respond to the calls at later times. Hence, an offline expert may respond to an offer task when he or she goes online with respect to the call center. An offer task sent to an offline expert may be considered to be a delayed offer task. By way of example, when a customer calls into a call center and there is no suitable expert either available or online with respect to a call center system, the call center system may send an offer task using e-mail, short message service (SMS), or an offline instant messaging system to a set of suitable experts who are not online with respect to the call center system. When a suitable expert accepts the offer task, a future call between the expert and the customer may be scheduled, and other experts who were offered the offer task may be informed that the task has already be accepted.

Sending an offer task to offline experts or knowledge workers in response to a customer call into a call center allows a request by the customer to be serviced efficiently. A call center system facilitates a connection between an appropriate expert and the customer even if the appropriate expert is not online with respect to the call center system. As such, the customer is able to effectively schedule a time to talk to a suitable expert without having to repeatedly call the call center to determine when a suitable expert is online with respect to the call center. The customer is also more likely to be able to consult with a suitable expert, and is less likely to have to consult an agent without the expertise needed to service the customer request. That is, the customer is more likely to be able to consult with the best knowledge worker for his or her needs, as he or she is not limited to accessing substantially only those knowledge workers who are online with respect to the call center system.

Figure 1:
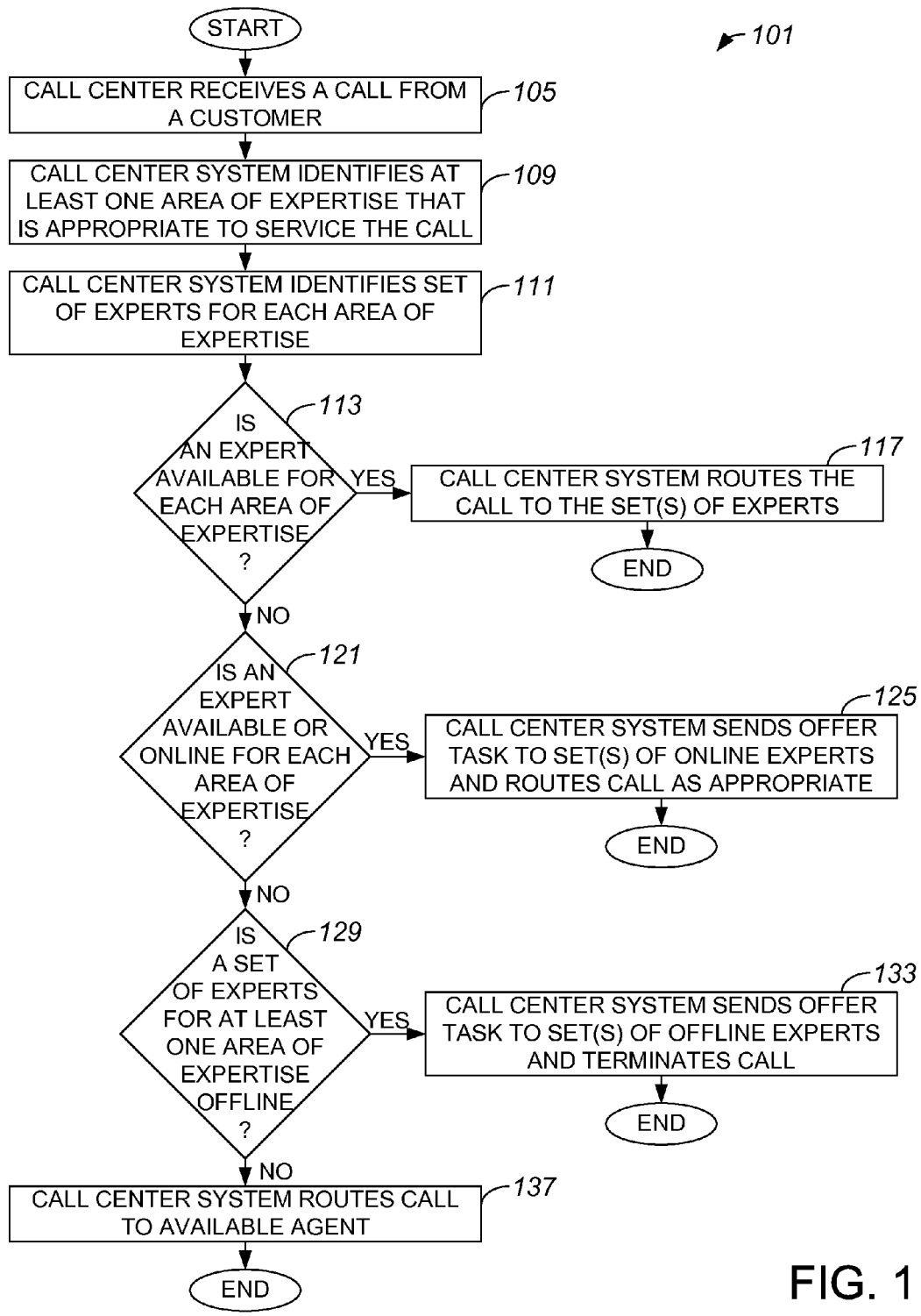
FIG. 1 is a process flow diagram which illustrates one overall method of responding to a customer call into a call center in accordance with an embodiment of the present invention.

Referring initially to FIG. 1, an overall method of processing a customer call into a call center will be described in accordance with an embodiment of the present invention. A method 101 of processing a customer call into a call center begins at step 105 in which the call center receives a call from a customer. Once the call is received from the customer, a call center system, e.g., a processing system associated with the call center, identifies areas of subject matter expertise which are appropriate to service the customer in step 109. In one embodiment, an interactive voice response (IVR) system, an interactive response system (IRS), or a call center agent who answers the call from the customer may inquire as to the needs of the customer, and then input such needs into the call center system to identify appropriate areas of expertise. It should be appreciated that any number of areas of expertise may be identified, as appropriate.

After at least one area of expertise that is appropriate to service the call from the customer is identified, the call center system identifies a set of experts for each identified area of expertise in step 111. That is, the call center system identifies suitable experts for each area of expertise. In general, the individuals who are most likely to provide assistance regarding an area of expertise are considered to be experts or knowledge workers in that area. Typically, at least one expert may be identified for each area of expertise. The sets of experts may generally include experts who are available, experts who are online, and experts who are offline. Experts who are available are generally those who are logged into a system or "on call" with respect to the call center and on duty to field calls from customers. Experts who are online may generally be those who are not on call, but are online with respect to the call center but currently not available to field calls from customers. Such experts may be logged into the call center system or present within the call center system using an instant messaging application. Experts who are offline are those who are neither on call nor online with respect to the call center system.

A determination is made in step 113 as to whether an expert is currently available for each identified area of expertise. That is, it is determined whether there is an expert for each identified area of expertise who is on duty and able to field the call from the customer. If it is determined that there is an expert available for each area of expertise, the indication is that the call from the customer may be serviced substantially immediately. As such, in step 117, the call center system effectively creates an interaction or a contact between the caller and a selected or otherwise identified expert in each area of expertise. In one embodiment, the experts and the customer participate in a conference call. The conference call may be substantially automatically created by the call center system such that the caller, experts, and other relevant resources are all effectively connected on the conference call. Once the call center system creates an interaction such as a conference call, the method of processing a customer call is completed.

Alternatively, if it is determined in step 113 that an expert is not currently available for each area of expertise, then process flow proceeds to step 121 in which it is determined if an expert is either available or online for each identified area of expertise. If it is determined that there is at least one available expert or online expert for each area of expertise, then the call center system sends an offer task to sets of online experts, and routes the call as appropriate in step 125. The offer task may be sent to both available and online experts, although it should be appreciated that the offer task may instead be sent to online experts while the call center system may send a notification to available experts which indicates that a call is to be serviced. Routing the call as appropriate typically includes routing the call to online experts who accept the offer task. A call may generally be routed or otherwise connected to more than one agent, e.g., expert. After the call center system sends an offer task to each identified set of online experts and routes the call as appropriate, the method of processing a customer call is completed.

Returning to step 121, if the determination is that there is no available or online expert for each area of expertise, then it is determined in step 129 if a set of experts for at least one identified area of expertise is offline. If it is determined that at least one set of experts for an identified area of expertise is offline, the call center system sends an offer task to the set or sets of offline experts suitable to service the customer call, in step 133. In one embodiment, once the offer task is sent, the call is terminated and the method of processing a call is completed.

Alternatively, if the determination in step 129 is that there is no set of experts for at least one area of expertise, the call center system routes the call in step 137 to an available agent or agents. The available agent or agents my be an entity, e.g., a human or a computing system, who is not a subject matter expert in an area needed by a customer, but who may be able to provide the information that is useful to the customer. For instance, if an expert on solving router issues is effectively non-existent, a call that requests assistance regarding router issues may be assigned to an agent who deals generally with computer hardware. The available expert may represent the closest match that is available to the customer. Once the call center system routes the call to an available agent, the method of processing a customer call is completed.

Figure 2A:
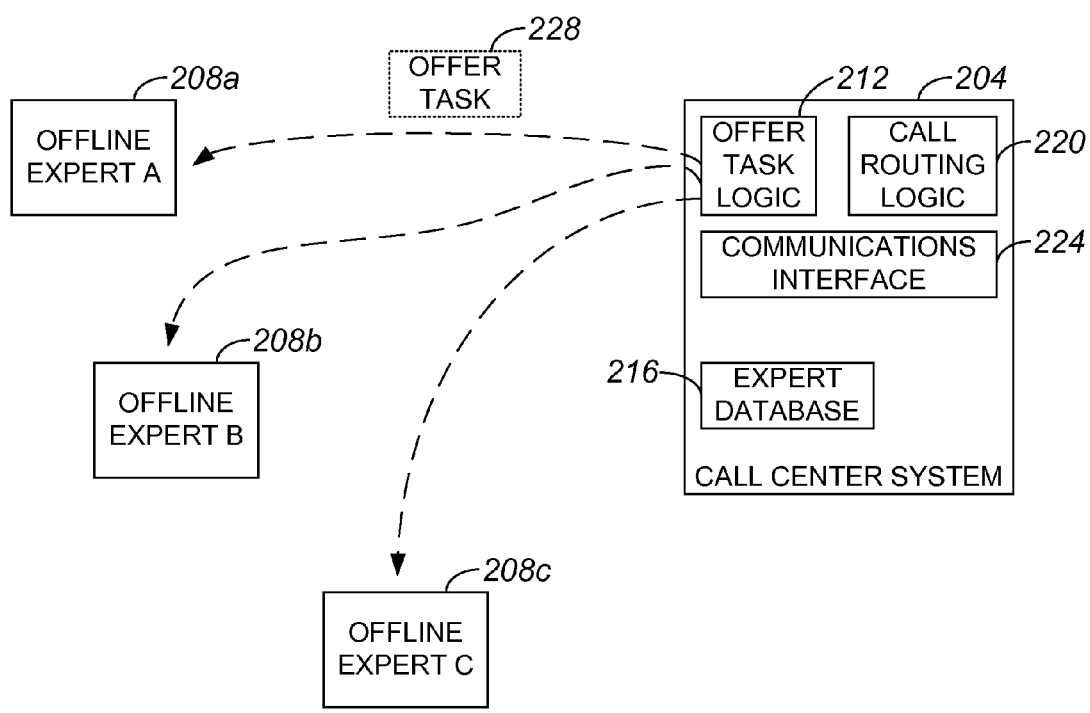
FIG. 2A is a block diagram representation of the processing of an offer task at a time t1 in accordance with an embodiment of the present invention.
Figure 2B:
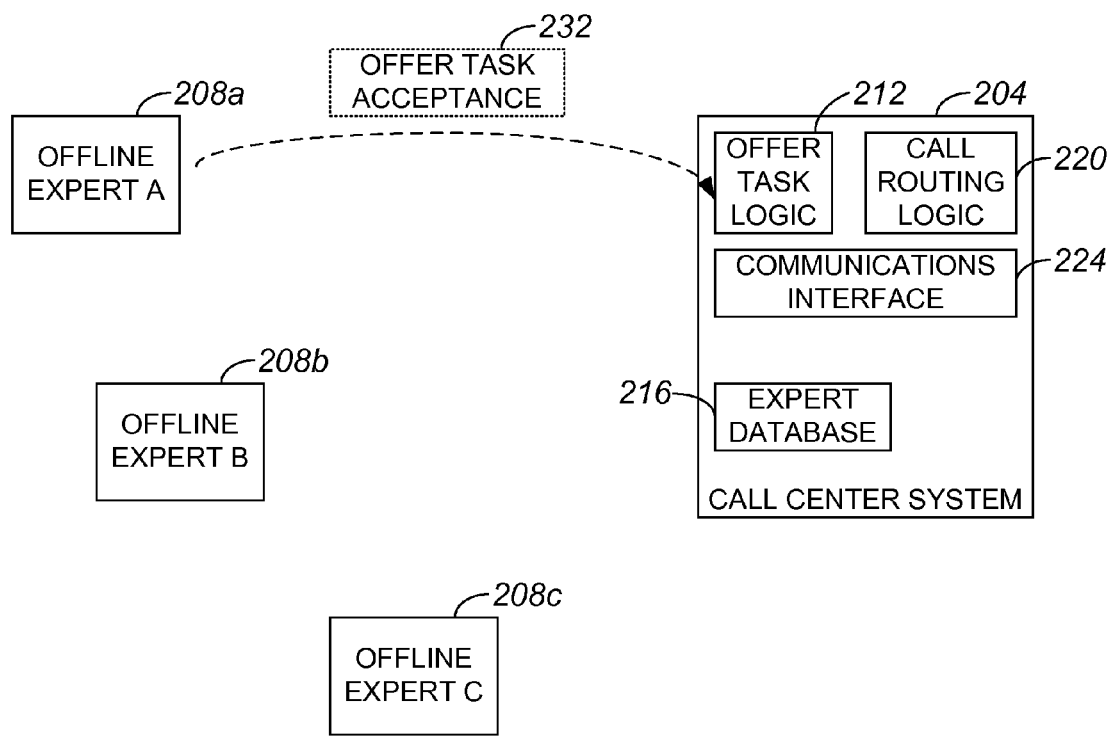
FIG. 2B is a block diagram representation of the processing of an offer task at a time t2 in accordance with an embodiment of the present invention.
Figure 2C:
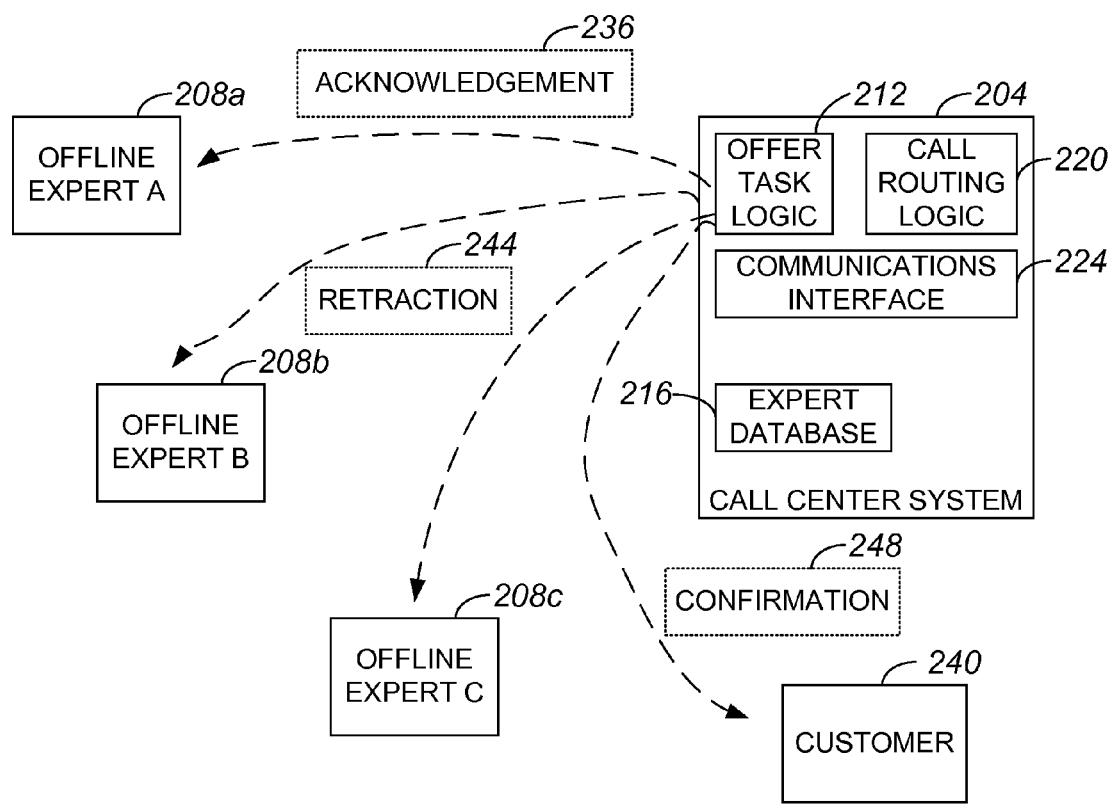
FIG. 2C is a block diagram representation of the processing of an offer task at a time t3 in accordance with an embodiment of the present invention.

With reference to FIGS. 2A-2C, the processing of an offer task, or a request for participation in a contact such as a callback, sent in response to a customer call received at a call center will be described. FIG. 2A is a block diagram representation of the processing of an offer task at a time t1 at which an offer task is sent to a set of offline experts in accordance with an embodiment of the present invention. At a time t1, a call center system sends an offer task 228 to a set of offline experts or knowledge workers 208a-208c. In the described embodiment, experts 208a-208c are associated with computing systems and/or telephone systems. The set of offline experts 208a-208c is identified by call center system 204 using an expert database 216 which may, in one embodiment, provide information regarding areas of expertise of each agent associated with call center system 204. Expert database 216 may also include a specification of a preferred modality of contact for each agent. By way of example, expert database 216 may include information which specifies that expert 'A' 208a prefers offline contact through e-mail, while expert 'B' 208b and expert 'C' 208c prefer offline contact modality of SMS.

Offer task logic 212 generally accesses expert database 216 to identify the set of offline experts 208a-208c to whom to send offer task 228. The set of offline experts 208a-208c is in communication with call center system 204 through a communications interface 224 such that information may be exchanged with call center system 204. Communications interface 224 also allows call center system 204 to communicate with a customer (not shown). Call center system 204 may arrange for calls to be routed such that at least one offline expert 208a-208c may subsequently participate in a call with which offer task 228 is associated. That is, call routing logic 220 may facilitate a future call between a customer (not shown) and at least one offline expert 208a-208c, as scheduled using offer task logic 212, to be initiated by call center system 204. In general, offer task logic 212 and call routing logic 220 may include hardware and/or software logic embodied on a tangible media.

Typically, offer task 228 contains information including, but not limited to including, a subject of a customer call and preferred time slots for a future call. In the described embodiment, an offline expert 208a-208c who accepts offer task 228 selects one of the preferred time slots. It should be appreciated, however, that in some embodiments, if none of the preferred time slots are acceptable to at least one of offline experts 208a-208c, the offline experts 208a-208c may propose a different time slot.

At a time t2, offline expert 'A' 208a accepts offer task 228, as shown in FIG. 2B. Offline expert 'A' 208a may see offer task 228 when he accesses the appropriate application, e.g., an e-mail system if offer task 228 was sent via e-mail. Offline expert 'A' 208a is assumed, for purposes of discussion, to access or otherwise obtain offer task 228 before offer task 228 expires or otherwise becomes stale.

When offline expert 'A' 208a accepts offer task 228, offline expert 'A' 208a sends an offer task acceptance 232 to call center system 204. Offer task acceptance 232 typically specifies a time selected by offline expert 'A' 208a at which he or she is available to assist the customer (not shown) associated with offer task 228. Offer task acceptance 232 is generally sent using the same modality on which offer task 228 was sent. By way of example, if offline expert 'A' 208a received offer task 228 on e-mail, offer task acceptance 232 is typically sent to call center system 204 via e-mail. It should be appreciated, however, that offer task acceptance 232 may be sent on substantially any suitable modality, and is not limited to being sent on the same modality over which offer task 228 was sent.

Upon receiving offer task acceptance 232, offer task logic 212 generally processes offer task acceptance 232. Processing offer task acceptance 232 may include identifying offline expert 'A' 208a as the party which accepted offer task 228, and identifying the time slot selected by offline expert 'A' 208a. FIG. 2C is a block diagram representation of the processing of an offer task at a time t3 after offer task logic 212 has processed offer task acceptance 232 in accordance with an embodiment of the present invention. At a time t3, offer task logic 212 sends messages to the set of offline experts 208a-208c, and to a customer 240 whose request prompted offer task 228 to be created and sent.

Offer task logic 212 sends or otherwise provides an acknowledgement 236 to offline expert 'A' 208a at time t3 which effectively confirms that offline expert 'A' 208a accepted offer task 228, and will be a part of a scheduled callback with customer 240 at the time specified in offer task acceptance 232. Acknowledgement 236 may be sent using the same modality on which offer task 228 was sent, although acknowledgement 236 may generally be sent using any suitable modality. Acknowledgement 236 may include a callback confirmation code which may be used by offline expert 'A' 208a in the event that, for example, he or she has a need to cancel the scheduled callback. In one embodiment, acknowledgement 236 may cause a calendar (not shown) associated with offline expert 'A' 208a to be updated to show the scheduled callback between offline expert 'A' 208a and customer 240.

Offer task logic 212 sends or otherwise provides a retraction 244 at time t3 to offline expert 'B' 208b and to offline expert 'C' 208c which effectively retracts offer task 228. Hence, offline expert 'B' 208b and offline expert 'C' 208c are informed that offer task 228 is no longer pending and available for them to accept. Retraction 244 may also indicate that offer task 228 has been accepted by offline expert 'A' 208a. Retraction 244 may be sent using the same modalities on which offer task 228 was sent to offline expert 'B' 208b and to offline expert 'C' 208c, although acknowledgement 236 may generally be sent using any suitable modality.

To inform customer 240 that a call between customer 240 and offline expert 'A' 208a has been scheduled, offer task logic 212 sends a confirmation 248 to customer 240 at time t3. Confirmation 248 may include a callback confirmation code which identifies the scheduled callback and, further, which provides a way for customer 240 to identify the scheduled callback should customer 240 have a need to cancel the scheduled callback. Confirmation 248 may be provided to customer 240 using any suitable modality. In one embodiment, customer 240 may specify a preferred modality over which to receive confirmation 248 when customer 240 previously contacted call center system 240. If a preferred modality is specified by customer 240, offer task logic 212 may use that modality to provide confirmation 248 to customer 240.

Figure 3A:
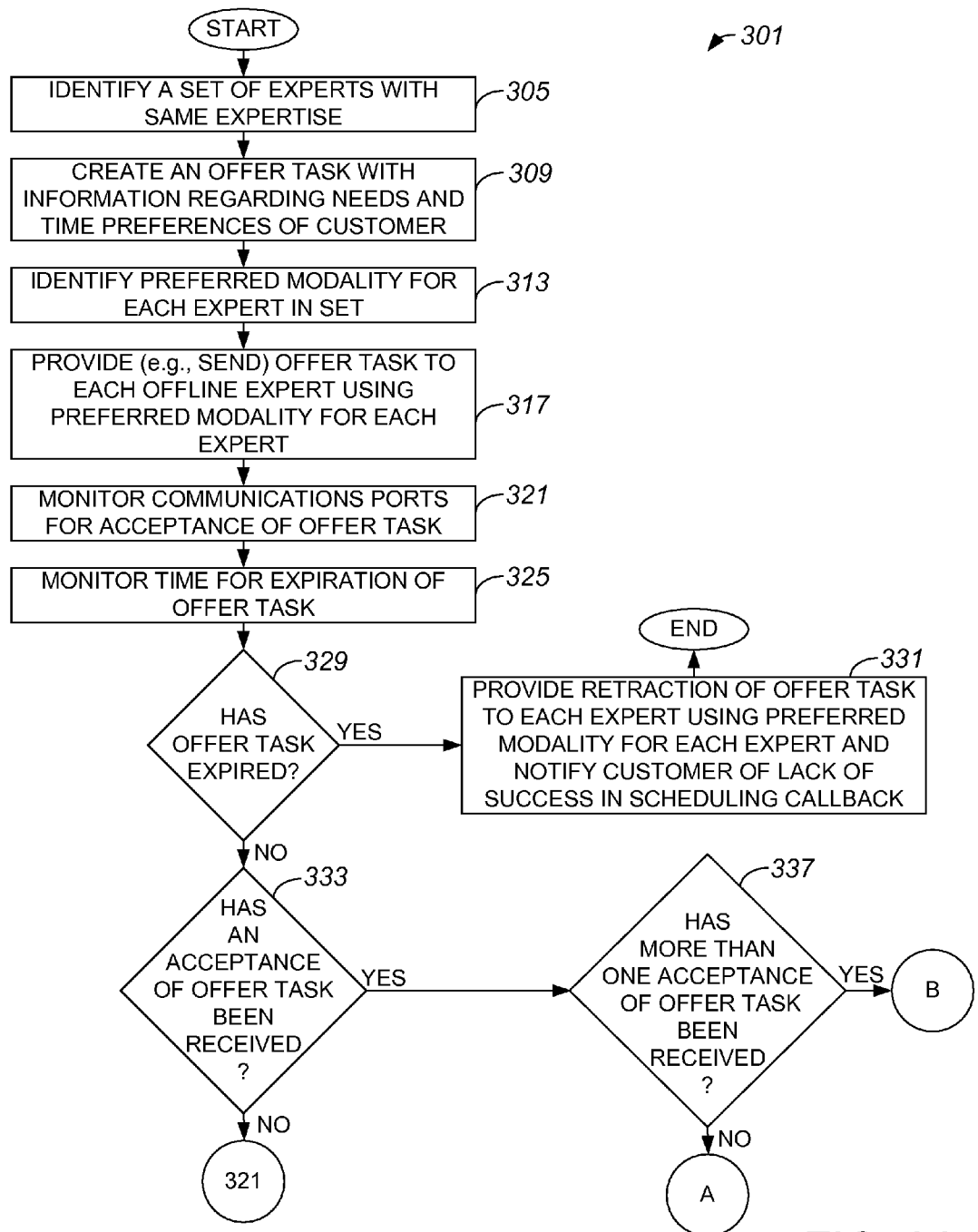
FIGS. 3A-3C are a process flow diagram which illustrates a method of processing an offer task sent to one set of experts from the point of view of a call center system in accordance with an embodiment of the present invention.
Figure 3B:
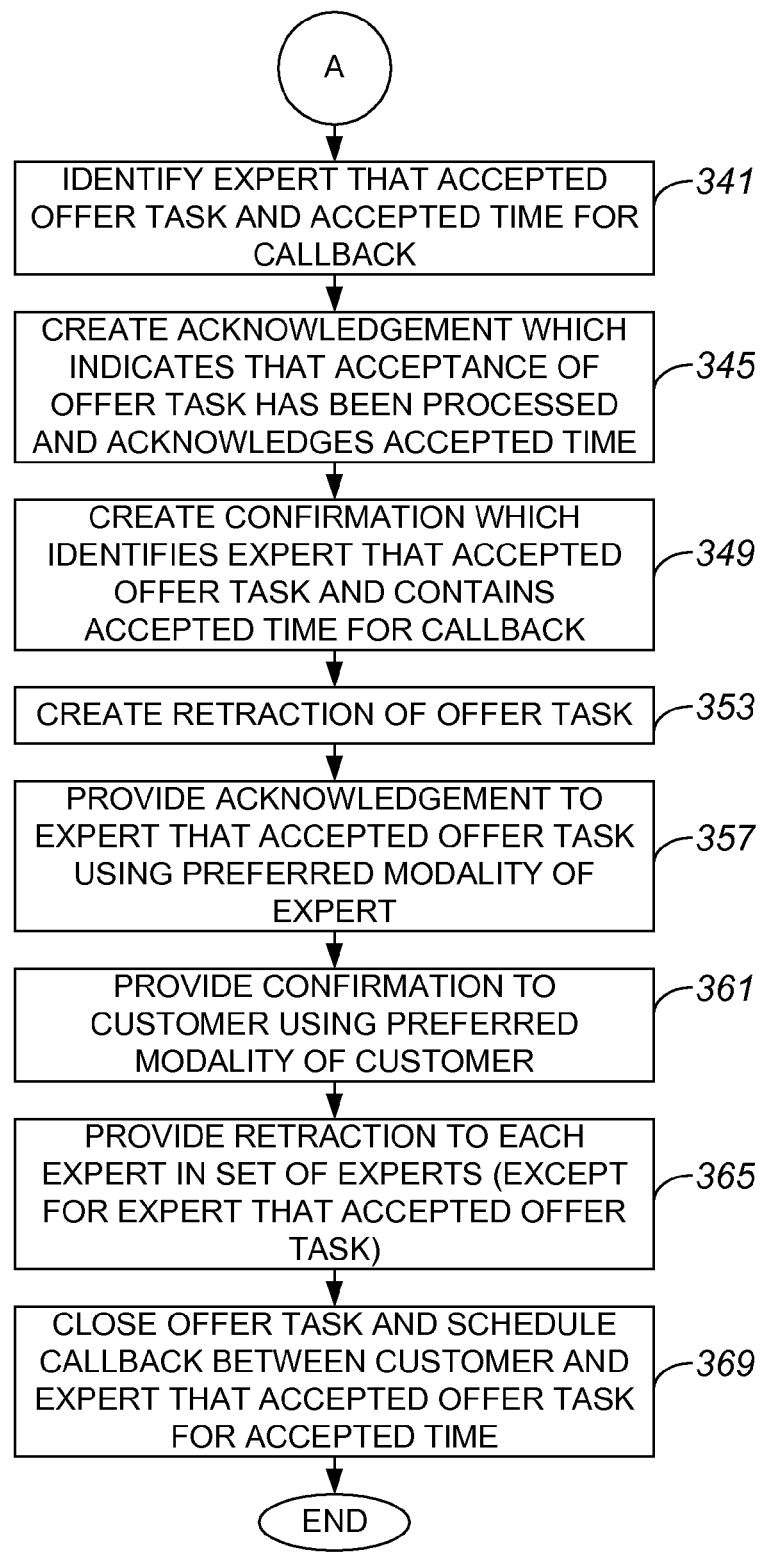
Figure 3C:
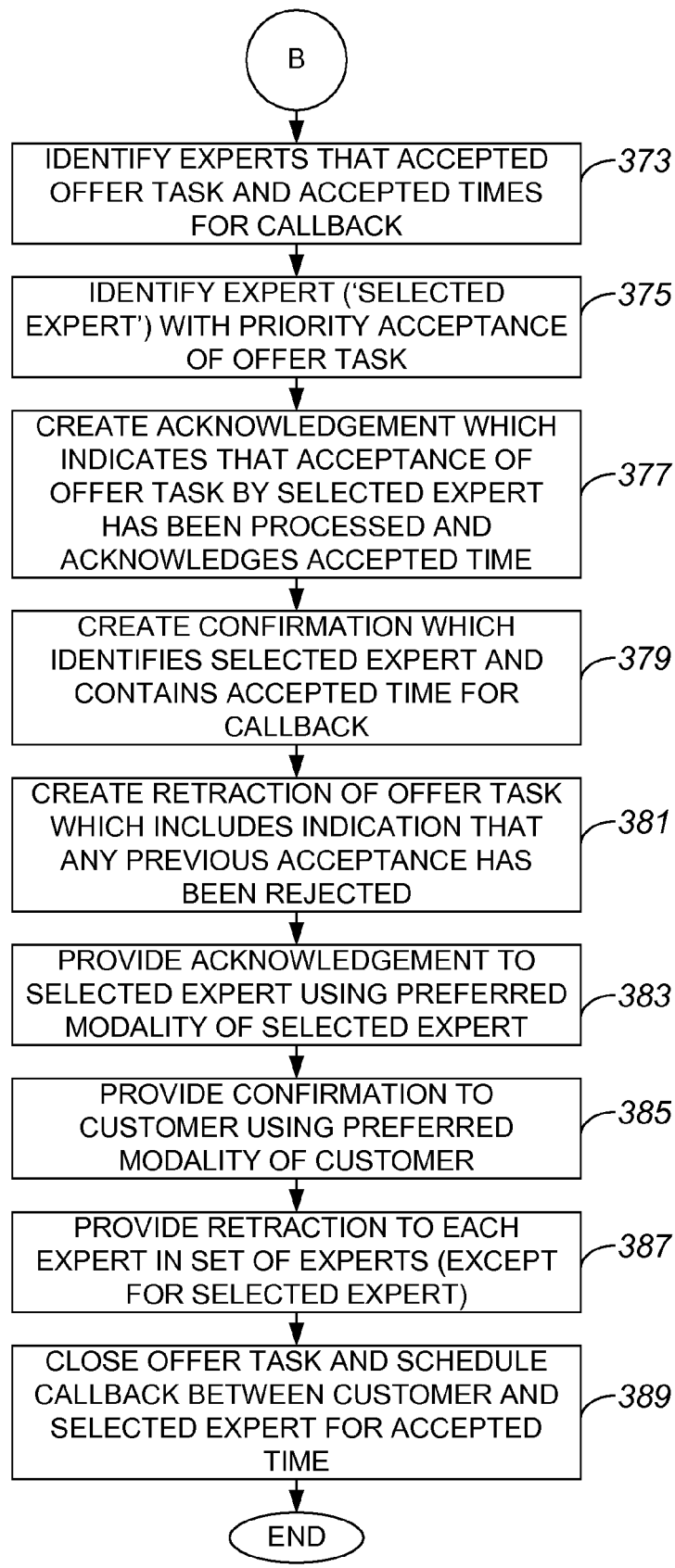

FIGS. 3A-3C are a process flow diagram which illustrates a method of processing an offer task, specifically an offer task sent to one set of offline experts, from the point of view of a call center system in accordance with an embodiment of the present invention. A method 301 of processing an offer task begins at step 305 in which a call center system identifies a set of experts with the same expertise, e.g., expertise in one area. In the described embodiment, each expert in the set of experts is currently offline, or offline when the set of experts is identified. As such, the set of experts is a set of offline experts.

Once the set of experts is identified, the call center system creates an offer task in step 309. The offer task generally includes information regarding the needs and the preferences specified by the customer in whose interests the offer task is being created. The needs may include an area in which the customer desires the services of an expert, and the preferences may include a modality over which the customer prefers to be contacted and/or at least one preferred time at which the customer would like to be called back by an expert. If the customer provides more than one preferred time during which he or she would like a callback scheduled, the customer may rank the preferred times to indicate an order of preference. The offer task may be created with an expiration or a time out, which effectively specifies when the offer task will no longer be active or available to be accepted. That is, a deadline by which a response to an offer task is substantially required may be specified.

In step 313, the call center system identifies a preferred modality for each expert in the set. The preferred modality is the manner in which an expert prefers to be provided with an offer task, and may be specified in an expert database, e.g., expert database 216 of FIGS. 2A-2C. If an expert has not specified a preferred modality, or if the preferred modality of the expert is otherwise unknown, a default modality may effectively be assigned as the preferred modality of the expert. By way of example, a default modality of e-mail may be used to send an offer task to an expert unless the expert has specified a different modality.

After the preferred modality for each expert in the set has been identified, the call center system provides the offer task, e.g., sends the offer task, to each expert in the set using the preferred modality for each expert in step 317. Then, in step 321, the call center system monitors communications ports to determine if there are any acceptances of the offer task. The call center system also effectively keeps track of time in step 325 such that the call center system will become aware of when the offer task expires.

A determination is made in step 329 as to whether the offer task has expired. If the offer task has expired, the indication is that there have been no acceptances of the offer task during the time in which the offer task was pending. Accordingly, in step 331, the call center system retracts the offer task by sending a retraction to each expert. Such a retraction may be sent or otherwise provided to the experts of the set using the preferred modality of each expert. The call center system also notifies the customer that there has been no success in scheduling a callback. Once the offer task is retracted and the customer is notified that a callback has not been scheduled, the processing of an offer task is completed. It should be appreciated that in some instances, the customer may be provided with an option to change the parameters associated with his request in order to trigger the creation of another offer task that is to be provided to offline agents.

Alternatively, if it is determined in step 329 that the offer task has not expired, the call center system determines in step 333 whether an acceptance of the offer task has been received. Such a determination may either be made periodically, e.g., at predetermined time intervals, or when a communication from any expert in the set is received. If it is determined that no acceptance of the offer task has been received, process flow returns to step 321 in which the call center system continues to monitor communications ports for an acceptance of the offer task.

On the other hand, if the determination in step 333 is that an acceptance of the offer task has been received, then a determination is made in step 337 as to whether more than one acceptance of the offer task has been received. It should be appreciated that more than one expert in the set may accept the offer task in the event that a first expert accepts the offer task, but the call center system is unable to process that acceptance before a second expert also accepts the offer task, i.e., multiple acceptances may be received at approximately the same time. Additionally, in one embodiment, if a first expert accepts the offer task but does not agree to a callback at a time that is most preferred by the customer, the call center system may decline to acknowledge that acceptance in hopes that a second expert may accept the offer task while agreeing to a callback at a time that is most preferred by the customer.

If it is determined in step 337 that substantially only one acceptance of the offer task has been received, then process flow moves to step 341 in which the expert who accepted the offer task and the accepted time for a callback are identified. Such information is generally contained in the received acceptance. After the call center system identifies the expert and the accepted time for a callback, the call center system creates an acknowledgement in step 345 which is arranged to indicate that the acceptance of the offer task has been processed. The acknowledgement also effectively provides a confirmation regarding the time for the callback which was indicated in the acceptance.

Once the acknowledgement is created, the call center system creates a confirmation, intended for the customer, which identifies the expert who accepted the offer task and the time for a callback in step 349. A retraction of the offer task is then created in step 353.

In step 357, the call center system provides the acknowledgement to the expert who accepted the offer task. The acknowledgement is generally provided using the preferred modality of the expert. In one embodiment, when the call center system provides the acknowledgement to the expert, the call center system may access a calendaring application associated with the expert to substantially automatically add the callback to the expert's calendar.

The call center system provides the confirmation in step 361 using the preferred modality of the customer. It should be appreciated that if the customer has not specified a preferred modality, the call center system may provide the confirmation using either a default modality or the modality used by the customer when he or she first contacted the overall call center.

After the confirmation is provided to the customer, the call center system retracts the offer task in step 365. The offer task is typically retracted by providing the retraction created in step 353 to each expert in the set, except for the expert who accepted the offer task. The call center system then closes the offer task, and schedules the callback between the customer and the expert who accepted the offer task in step 369. Scheduling the callback may include setting up a conference call between the customer and the expert which is to be connected by the call center system. Once the offer task is closed and the callback between the customer and the expert is scheduled, the processing of an offer task is completed.

Returning to step 337, if it is determined that more than one acceptance of the offer task has been received, then process flow moves from step 337 to step 373 in which the call center system identifies the experts who accepted the offer task and the times which the experts selected for a callback. In step 375, the call center system identifies an expert, i.e., a selected expert, from among those who accepted the offer task to participate in a callback with the customer. The selected expert may be chosen based on a priority. A priority may be assigned to each expert who accepted the offer task based on the time at which each expert accepted the offer task, and/or the time selected by each expert for a callback. By way of example, the selected expert may be the expert who agreed to a callback at a time which is most preferred by the customer. In one embodiment, the selected expert may be chosen substantially randomly. In another embodiment, the selected expert may be chosen based on his or her level of proficiency in the specific required skill.

After the selected expert is identified, the call center system creates an acknowledgement in step 377 which indicates that the acceptance of the offer task by the selected expert has been processed and effectively confirms the time at which the callback will occur. Then, in step 379, the call center system creates a confirmation which identifies the selected expert and the time at which the callback will occur. A retraction of the offer task is created in step 381. The retraction may contain an indication that the recipient of the retraction has not been selected for a callback, and that the offer task is no longer active.

From step 381, process flow moves to step 383 in which the call center system provides the acknowledgement to the selected expert using the preferred modality of the selected expert. The confirmation is provided to the customer using the preferred modality of the customer in step 385, and the retraction is provided to each expert in the set of experts, with the exception of the selected expert, in step 387. Finally, in step 389, the offer task is closed, and the call center system schedules the callback between the customer and the selected expert at the time agreed upon by the selected expert. Once the offer task is closed and the call center system schedules the callback, the processing of an offer task is completed.

Figure 4:
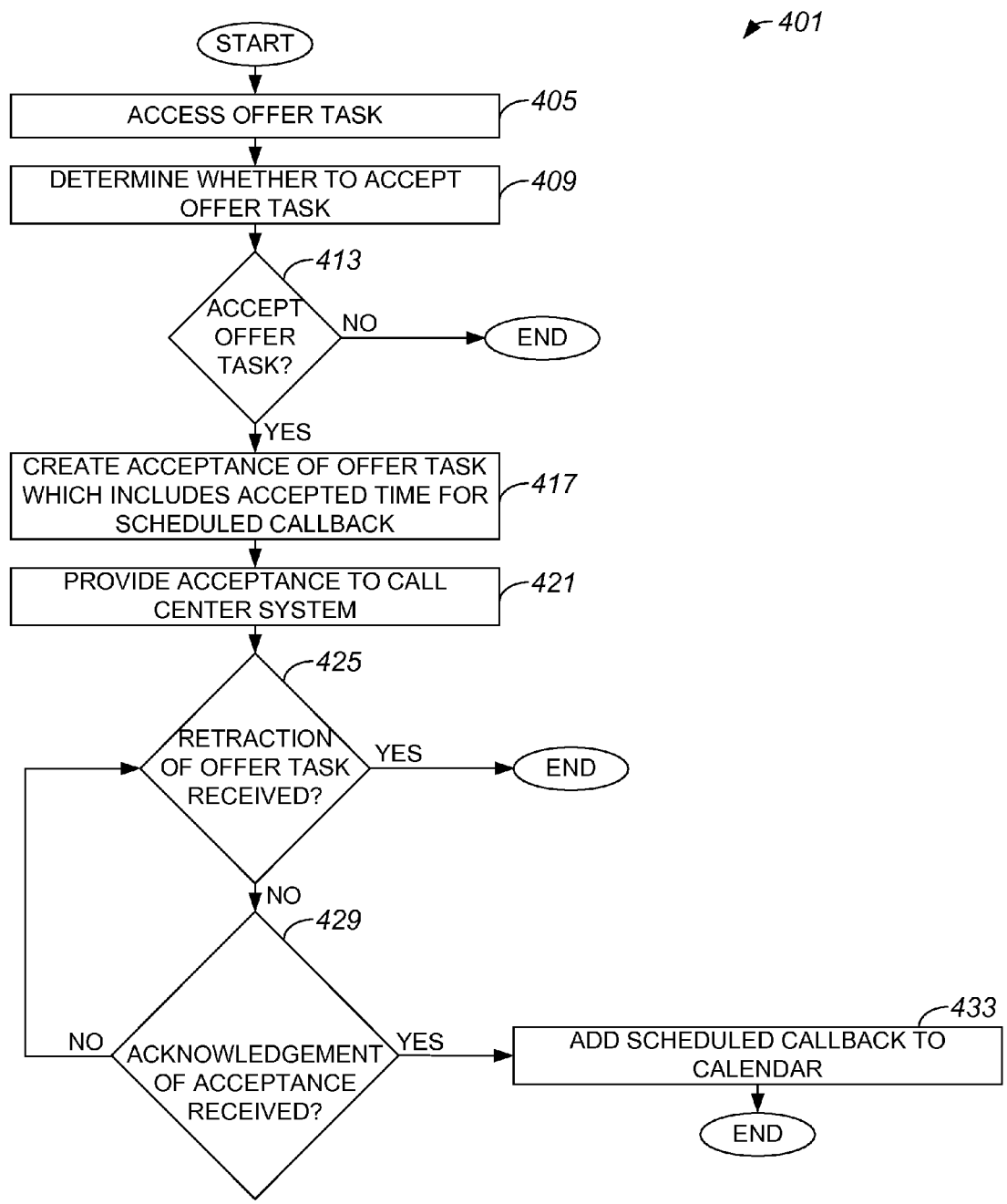
FIG. 4 is a process flow diagram which illustrates a method of processing an offer task sent to one set of experts from the point of view of an expert in the set in accordance with an embodiment of the present invention.

Referring next to FIG. 4, a method of processing an offer task sent to one set of offline experts from the point of view of an expert in the set will be described in accordance with an embodiment of the present invention. A method 401 of processing an offer task from the point of view of an expert who receives the offer task begins at step 405 in which the expert accesses the offer task which was provided by a call center system. For purposes of discussion, it is assumed that the offer task is accessible, and has neither expired nor been retracted. The offer task may be accessed by the expert, for example, when the expert accesses e-mail if the offer task was set via e-mail.

In step 409, the expert determines whether to accept the offer task. Then, in step 413, it is determined if the expert has accepted the offer task. If it is determined that the expert has not accepted the offer task, then the processing of an offer task is completed. It should be appreciated, however, that in some systems, the expert may be allowed to propose alternative times for a callback if his or her reason for not accepting the offer task is an inability to accept a callback at times requested by a customer.

Alternatively, if it is determined in step 413 that the expert has accepted the offer task, then a system associated with the expert, e.g., a computing system or a telephone system, is used by the expert in step 417 to create an acceptance of the offer task. The acceptance may include, but is not limited to, the time at which the expert is agreeing to participate in a callback. Once the acceptance is created, the acceptance is provided to the call center system in step 421.

A determination is made in step 425 as to whether a retraction of the offer task has been received by the expert. It should be appreciated that the retraction of the offer task may be received if another expert with a matching skills set has accepted the offer task and, hence, the acceptance provided in step 421 has essentially been rejected. If a retraction of the offer task is received, then the processing of an offer task is completed.

On the other hand, if no retraction of the offer task is received, then it is determined in step 429 whether an acknowledgement of the acceptance has been received from the call center system. If no acknowledgement has been received, process flow returns to step 425 in which it is determined if the offer task has been retracted. Alternatively, if an acknowledgement of the acceptance is received, the indication is that a callback between the expert and the customer may be successfully scheduled. As such, the scheduled callback is added to the expert's calendar using a calendaring application in step 433. In one embodiment, the call center system adds the callback to the expert's calendar. It should be appreciated, however, that the expert may instead add the callback to his or her own calendar. Once the scheduled callback is added to the expert's calendar, the processing of an offer task is completed.

Figure 5:
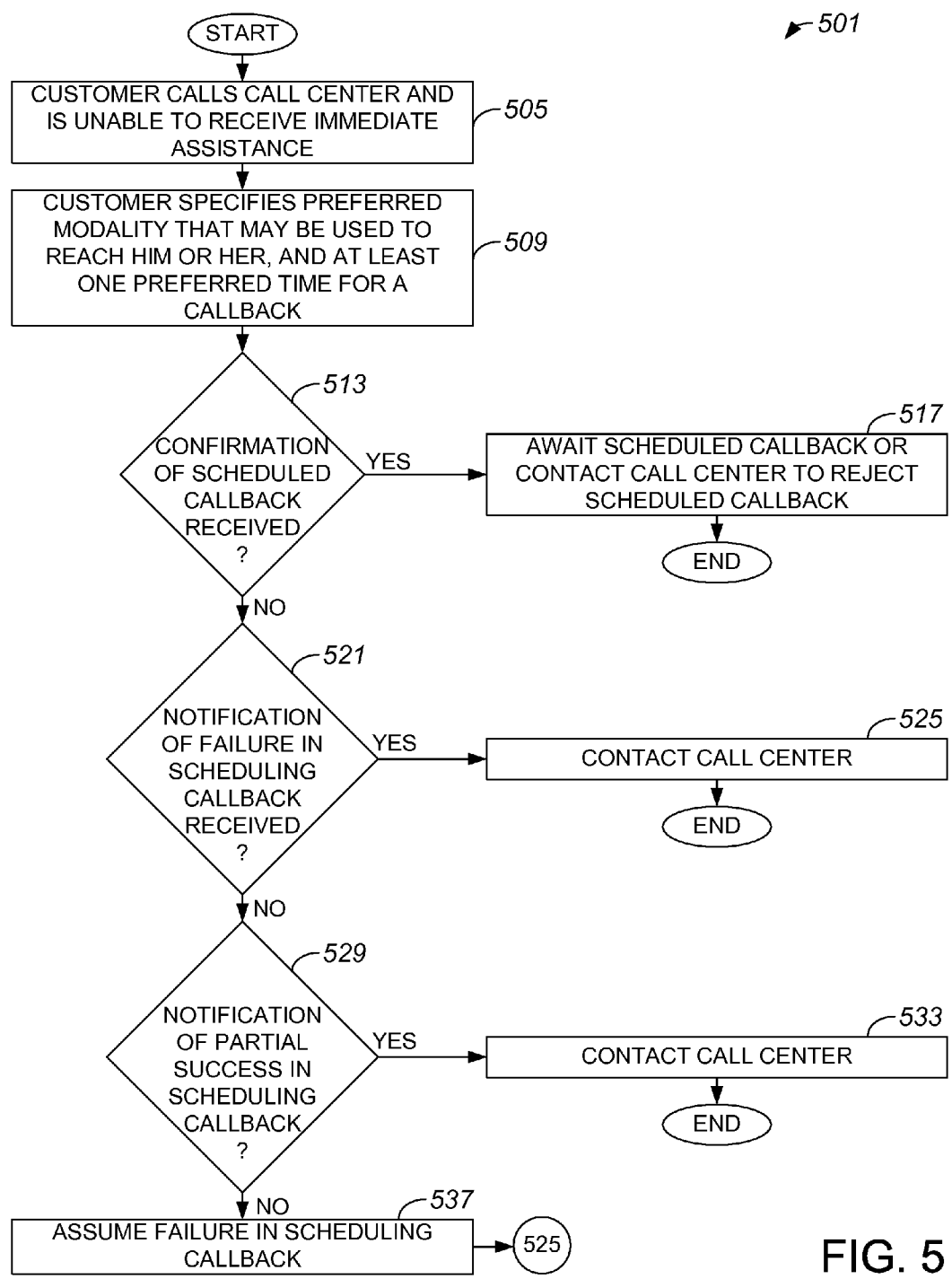
FIG. 5 is a process flow diagram which illustrates a method of obtaining assistance from a call center in accordance with an embodiment of the present invention.
Figure 6A:
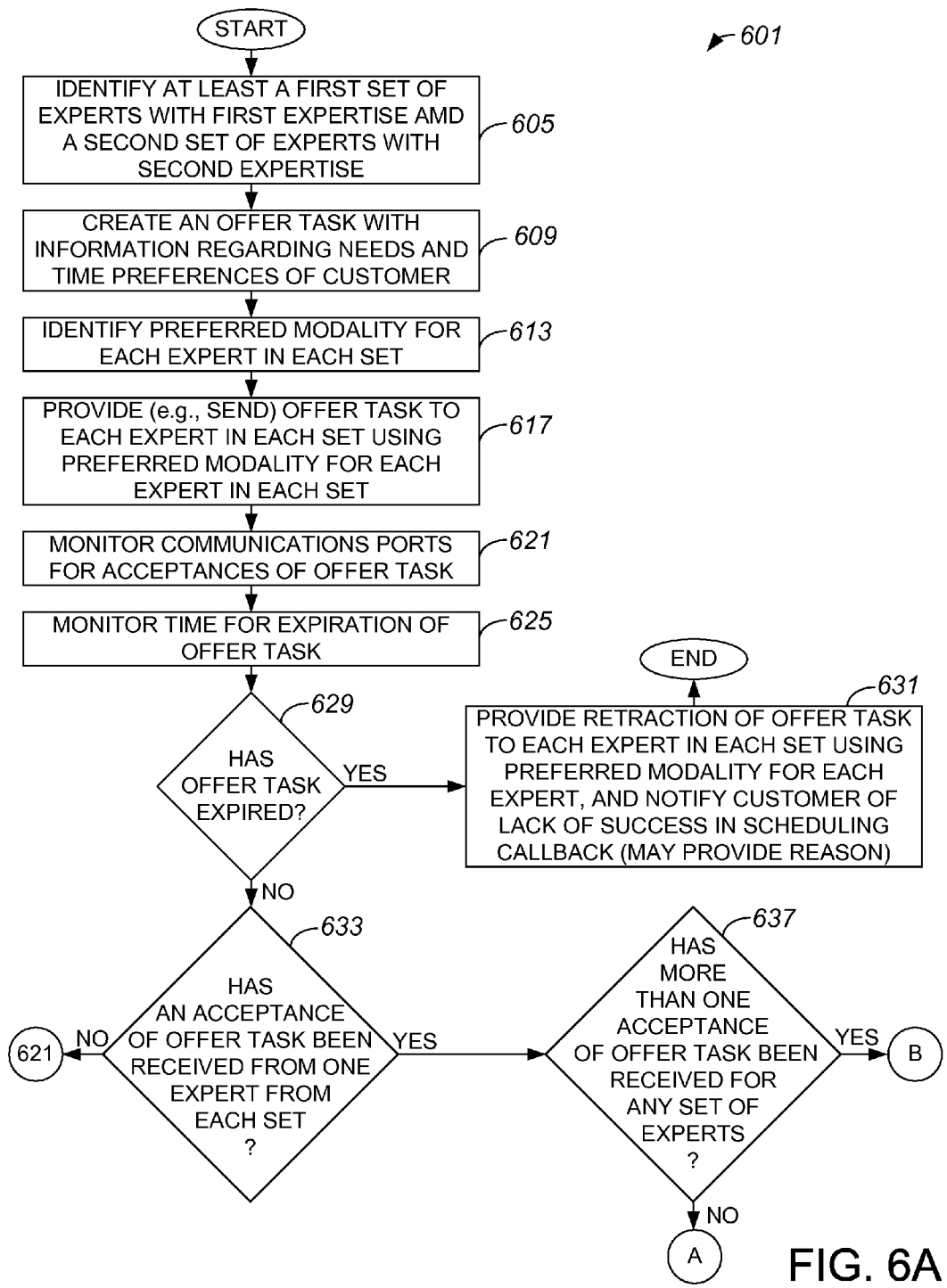
FIGS. 6A-6D are a process flow diagram which illustrates a method of processing an offer task sent to more than one set of experts from the point of view of a call center system in accordance with an embodiment of the present invention.
Figure 6B:
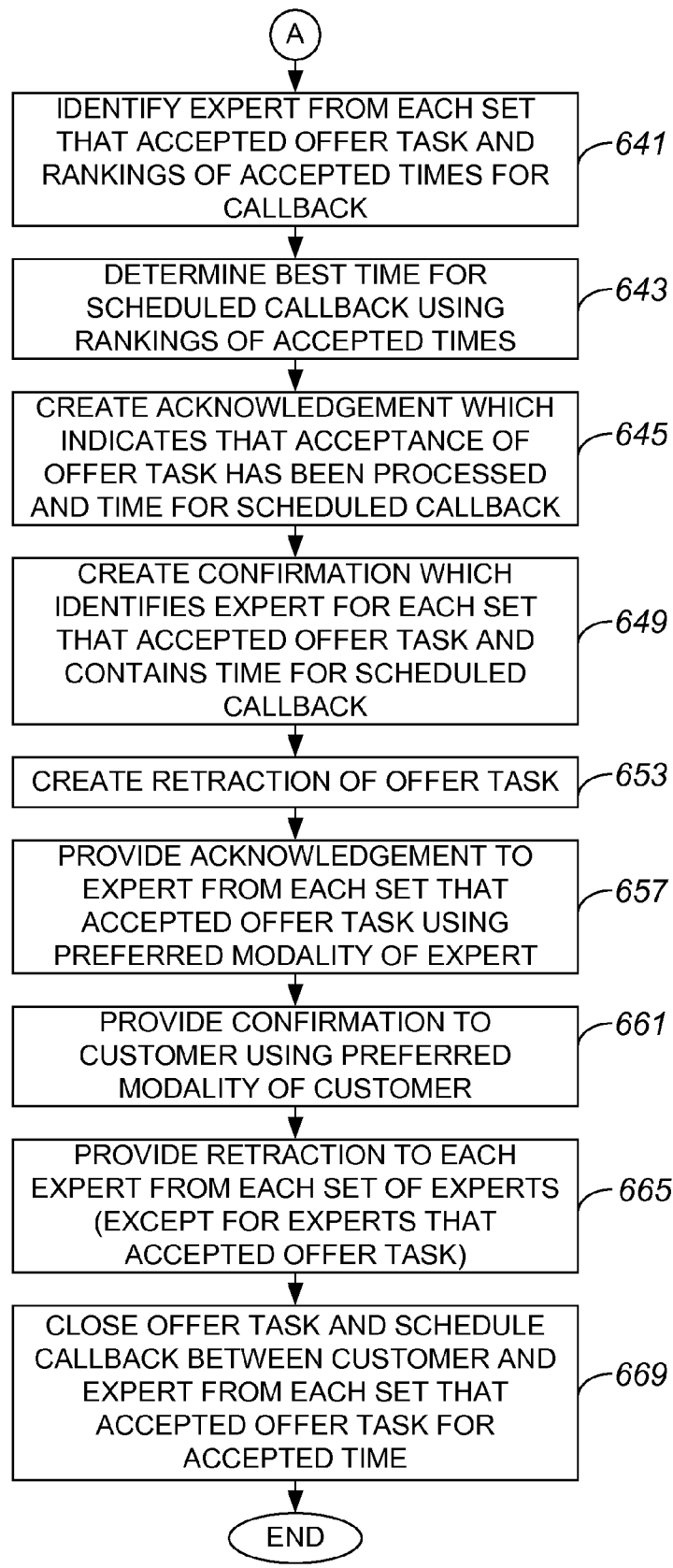
Figure 6C:
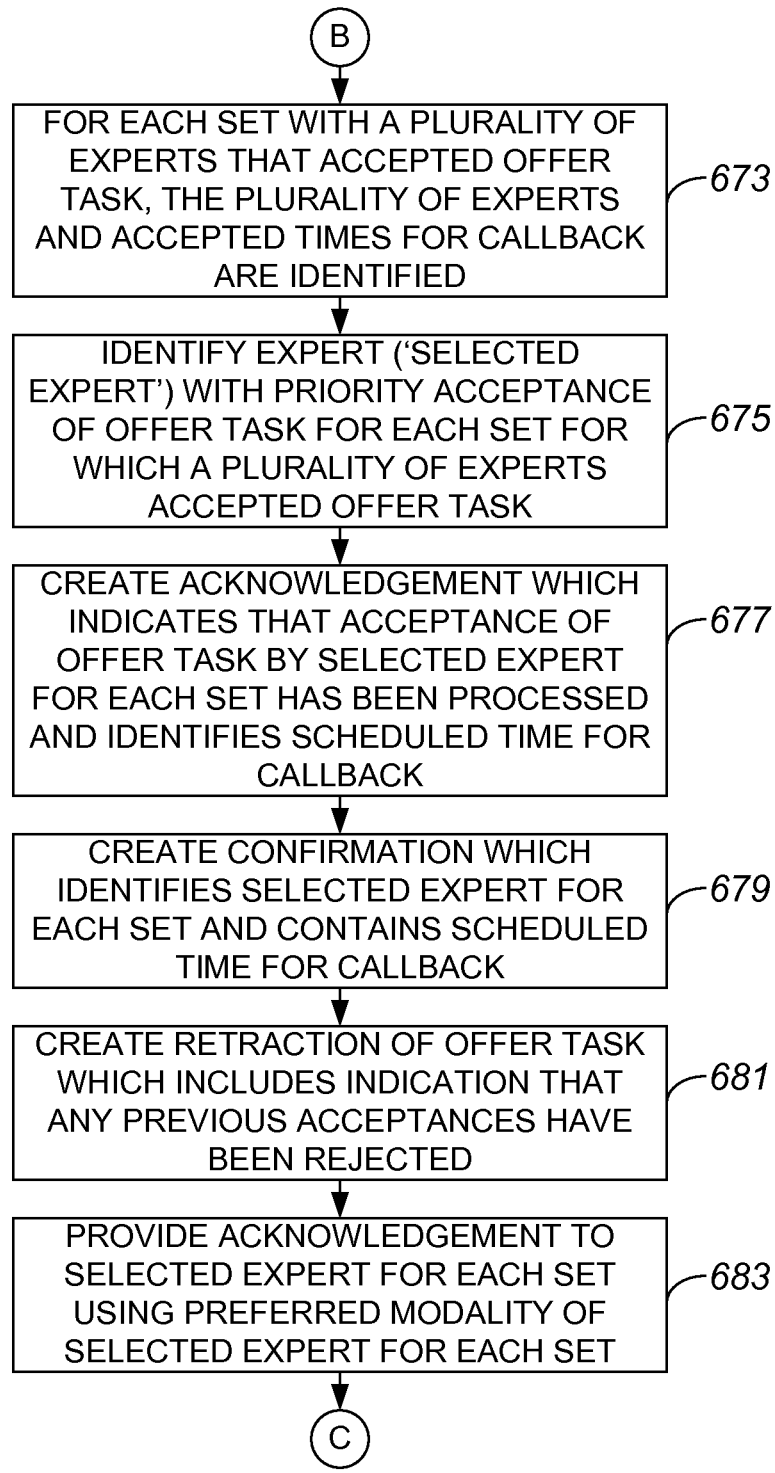
Figure 6D:
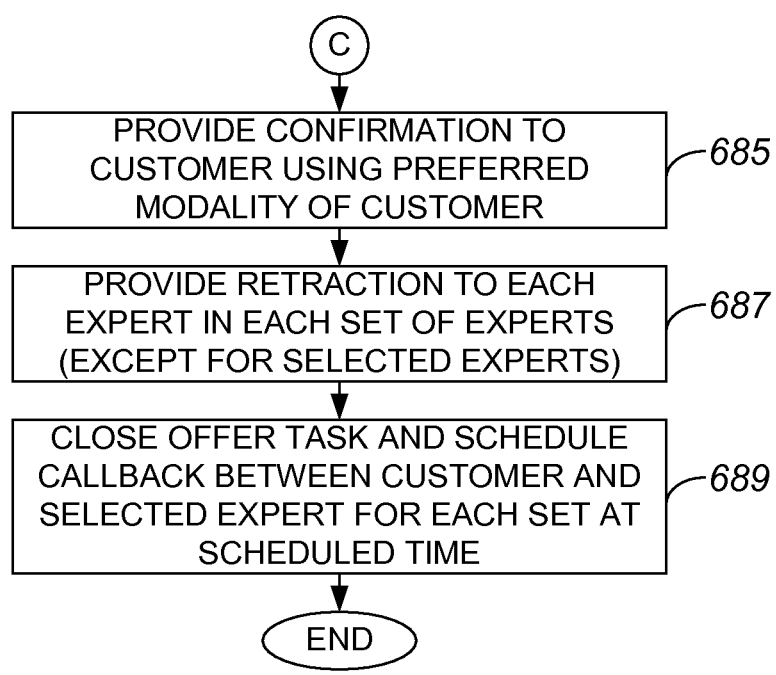

When a customer calls into, or otherwise accesses, a call center, he or she is attempting to obtain assistance. As described above, the assistance may come from a single expert. Alternatively, the assistance may come from more than one expert. Such experts may all be offline when the customer contacts the all center. FIG. 5 is a process flow diagram which illustrates a general method of obtaining assistance from one or more offline experts associated with a call center in accordance with an embodiment of the present invention. A process 501 of obtaining assistance from at least one offline expert begins at step 505 in which a customer calls, or otherwise contacts, a call center and is unable to receive immediate assistance. By way of example, the customer may require assistance in an area or areas for which no experts are online with respect to a call center system.

When the customer is unable to receive immediate assistance, the customer may provide information in step 509 that may be used by a call center system to generate an offer task and, hence, attempt to arrange a callback for the customer. The customer may specify a preferred modality that may be used to reach him or her when a callback is scheduled, as well as at least one preferred time for a callback. When a customer identifies at least one preferred time for a callback, the customer may prioritize his or her preferences. In one embodiment, the customer may also specify a time by which he or she substantially needs to know whether a callback will be scheduled. Such a time may correspond to an expiration time for an offer task.

After the customer provides information to the call center system, the customer may await contact from the call center system. The contact is typically in the form of a confirmation that a callback has been scheduled, or an indication that a callback has not been successfully scheduled. Hence, it is determined in step 513 whether a confirmation of a scheduled callback has been received. If such a confirmation is received, then the customer may take note of the time for the scheduled callback, and await the scheduled callback in step 517. It should be appreciated that if the customer is not satisfied with the scheduled callback time, e.g., if the scheduled callback is at a time which is not a preferred time for the customer, the customer may instead contact the call center to reject the scheduled callback. The process of obtaining assistance from a call center is completed once the customer either awaits the scheduled callback or rejects the scheduled callback.

Alternatively, if it is determined in step 513 that no confirmation of a scheduled callback is received, then a determination is made in step 521 as to whether a notification regarding a failure in scheduling a callback is received. If a notification regarding a failure is received, the implication may be that an offer task has timed out, or that a suitable expert or a group of suitable experts who may address substantially all issues of the customer has not acquiesced to service the offer task within the requested time periods. Hence, the customer may contact the call center in step 525 to specify alternative preferred times, or to attempt to solicit real-time assistance. Once the customer contacts the call center, the process of obtaining assistance from a call center is completed.

On the other hand, if no notification of a failure in scheduling a callback is received in step 521, then process flow proceeds to step 529 in which it is determined if a notification regarding a partial success in scheduling a callback has been received. Notification of a partial success may be, in one embodiment, a notification which indicates that the assistance sought by the customer was best served by more than one expert, and that not all needed experts had agreed to participate in a callback. Such a notification may also be a notification that a needed expert or needed experts agreed to participate in a callback, but not at any of the times specified or otherwise put forth by the customer. If it is determined that a notification regarding the partial success in scheduling a callback was received, then in step 533, the customer may contact the call center, and the process of obtaining assistance is completed.

If, however, no notification of a partial success has been received, the indication is that a callback may not be scheduled between the customer and an expert who was offline when the customer called the call center. As such, process flow moves from step 529 to step 537 in which a failure to schedule a callback is effectively assumed. Hence, if the customer is still in need to assistance, he or she may once again contact the call center in an attempt to obtain assistance. After the failure to schedule a callback is assumed, process flow returns to step 525 in which the customer may contact the call center. In one embodiment, the customer may contact the call center to substantially reinitiate a request for assistance. That is, once an offer task has substantially failed to result in a scheduled callback, that offer task is considered to be expired, and a customer who still desires assistance will generally have to reinitiate a request for assistance.

If a call center system provides an offer task to more than one group of experts, where each group of experts has a relatively unique skills set, the call center system effectively ensures that an expert from each group accepts the offer task before scheduling a callback. FIGS. 6A-6D are a process flow diagram which illustrates a method of processing an offer task sent to more than one set of experts or knowledge workers from the point of view of a call center system in accordance with an embodiment of the present invention. A method 601 of processing an offer task sent to at least two different sets of experts where each set of experts has a substantially unique skills set begins at step 605 in which a call center system identifies at least a first set of experts with the same expertise, e.g., expertise in a first area, and a second set of experts with the same expertise, e.g., expertise in a second area. Substantially all sets of experts, in the described embodiment, are sets of offline experts. It should be appreciated, however, that one or more of the sets of experts may include online experts. If there are sets of offline experts and sets of online experts, a callback may not be scheduled until an expert from each set effectively agrees to participate in a callback. Such a callback may generally be initiated at the appropriate time, e.g., at a scheduled time, by either a call center system or a customer, After the first and second sets of experts are identified, the call center system creates an offer task, i.e., a "team offer task," in step 609 that may include information regarding the needs and the preferences specified by the customer in whose interests the offer task is being created. The needs may include the first area and the second area in which the customer desires the services of an expert, and the preferences may include a modality over which the customer prefers to be contacted and/or at least one preferred time at which the customer would like to be called back by an expert. If the customer provides more than one preferred time during which he or she would like a callback scheduled, the customer may rank the preferred times to indicate an order of preference. The offer task may be created with an expiration or a time out.

The call center system identifies a preferred modality for each expert in each set in step 613. It should be appreciated that if a particular expert has not specified a preferred modality, or if the preferred modality of the particular expert is otherwise unknown, a default modality associated with the call center system may effectively be assigned as the preferred modality of the particular expert.

Once the preferred modality for each expert in the set has been identified, process flow moves to step 617 in which the call center system provides the offer task, e.g., sends the offer task, to each expert in each set using the preferred modality for each expert in each set. Then, in step 621, the call center system monitors communications ports to determine if there are any acceptances of the offer task. The call center system also effectively keeps track of time in step 625 such that the call center system will become aware of when the offer task expires.

It is determined in step 629 if the offer task has expired. If the offer task has expired, the indication is that there have been no acceptances of the offer task by an expert in each set of experts during the time in which the offer task was pending. Hence, in step 631, the call center system retracts the offer task by sending a retraction to each expert in each set. Such a retraction may be sent or otherwise provided to the experts of the set using the preferred modality of each expert. The call center system also notifies the customer that there has been no success in scheduling a callback, and may provide the customer with a reason. By way of example, if an expert with expertise in a first desired area has accepted the offer task but no expert with expertise in a second desired area has accepted the offer task, then the call center system may notify the customer that his or her needs have not been completely met. Once the offer task is retracted and the customer is notified that a callback has not been scheduled, the processing of an offer task is completed.

Alternatively, if it is determined in step 629 that the offer task has not expired, the call center system determines in step 633 whether an acceptance of the offer task has been received from an expert associated with each set of experts. That is, it is determined if an expert in each area of expertise needed by the customer has accepted the offer task. Such a determination may either be made periodically, e.g., at predetermined time intervals, or when a communication from any expert in the set is received.

If it is determined in step 633 that no acceptance of the offer task has been received from one expert in each set, the process flow returns to step 621 in which the call center system continues to monitor communications ports for an acceptance of the offer task. If, however, the determination in step 633 is that an acceptance of the offer task has been received from one expert in each set, then a determination is made in step 637 as to whether more than one acceptance of the offer task has been received from experts associated with one of the sets of the experts.

If it is determined in step 637 that substantially only one acceptance of the offer task has been received with respect to each set, then process flow moves to step 641 in which the expert who accepted the offer task for each set, and the accepted times for a callback, are identified. Such information is generally contained in the received acceptance. After the call center system identifies the experts and their respective accepted times for a callback, the call center system determines the best time for a scheduled callback in step 643. The best time may be the time when each expert is available that has the highest proficiency in the skills needed to provide service to the customer. For ease of discussion, it is assumed that there is overlap in accepted times for a callback. However, if there is no overlap, then the call center system may assign a time or may communicate with the experts and/or the customer in an effort to find a mutually agreed upon time.

The call center system creates an acknowledgement in step 645 which is arranged to indicate that the acceptance of the offer task has been processed. The acknowledgement also effectively provides a confirmation regarding the time for the callback which was determined in step 643. Once the acknowledgement is created, the call center system creates a confirmation, intended for the customer, which identifies the experts, i.e., an expert for each area of expertise, who accepted the offer task and the time for a callback in step 649. A retraction of the offer task is then created in step 653.

The call center system provides the acknowledgement to the expert in each set who accepted the offer task in step 657. The acknowledgement is generally provided using the preferred modality of each expert. In one embodiment, when the call center system provides the acknowledgement to the experts, the call center system may access a calendaring application associated with the experts to substantially automatically add the callback to the calendars of each expert.

In step 661, the call center system provides the confirmation to the customer using the preferred modality of the customer. It should be appreciated that if the customer has not specified a preferred modality, the call center system may provide the confirmation using either a default modality or the modality used by the customer when he or she first contacted the overall call center.

After the confirmation is provided to the customer, the call center system retracts the offer task in step 665 from agents who will not be needed to service the call. The offer task is typically retracted by providing the retraction created in step 653 to each expert in each set, except for the experts who accepted the offer task and will effectively be needed to service the call. The call center system then closes the offer task in step 669, and schedules the callback between the customer and the experts who accepted the offer task. Scheduling the callback may include setting up a conference call between the customer and the experts which is to be connected by the call center system. Once the offer task is closed and the callback between the customer and the expert is scheduled, the processing of an offer task is completed.

Returning to step 637, if it is determined that more than one acceptance of the offer task has been received with respect to at least one of the sets of desired, e.g., required, expertise, then process flow moves to step 673. In step 673, for each set with a plurality of experts that accepted the offer task, the call center system identifies the experts who accepted the offer task, the level of proficiency of the experts with respect to the relevant skills, and the times which the experts selected for a callback. Then, in step 675, the call center system identifies an expert, i.e., a selected expert, for each set from among those who accepted the offer task to participate in a callback with the customer. The selected experts, e.g., a team of experts who will participated in a callback, may be chosen based on a priority, their level of proficiency with respect to a skill for which they are considered experts, and/or any suitable algorithms typically used for selecting agents in a call center system.

Once the selected expert for each set in which a plurality of experts accepted an offer task is identified, the call center system creates an acknowledgement in step 677 which indicates that the acceptance of the offer task by the selected expert for each set has been processed, and effectively confirms the time at which the callback will occur. Confirming the time at which the callback will occur may include selecting a time that is common to each selected expert. The call center system the creates a confirmation which identifies the selected expert for each set and the time at which the callback will occur in step 679. A retraction of the offer task is then created in step 681. The retraction generally contains an indication that any previous acceptance of the offer task that may have been sent by a recipient of the retraction has effectively been rejected by the call center system.

After the retraction is created, the call center system provides the acknowledgement to the selected expert for each set in step 683 using the preferred modality of the selected expert for each set. The confirmation is provided to the customer using the preferred modality of the customer in step 685, and the retraction is provided to each expert in the sets of experts, with the exception of the selected experts, in step 687. Then, in step 689, the offer task is closed, and the call center system schedules the callback between the customer and the selected experts at the time identified in step 677. Once the offer task is closed and the call center system schedules the callback, the processing of an offer task is completed.

Figure 7:
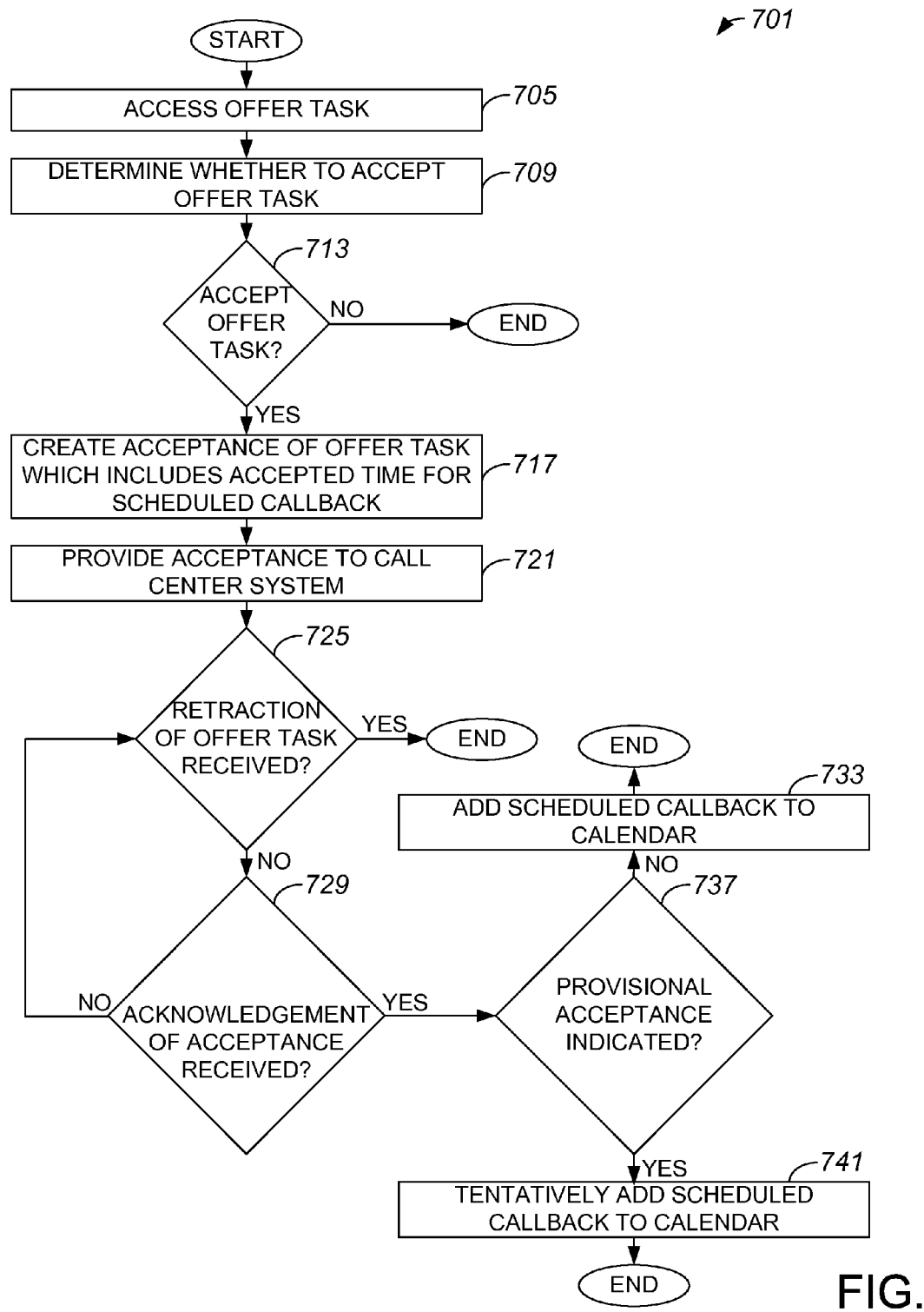
FIG. 7 is a process flow diagram which illustrates a method of processing an offer task sent to more than one set of experts from the point of view of an expert in one of the sets in accordance with an embodiment of the present invention.

FIG. 7 is a process flow diagram which illustrates a method of processing an offer task sent to more than one set of experts from the point of view of an expert in one of the sets in accordance with an embodiment of the present invention. A method 701 of processing an offer task from the point of view of an expert who receives the offer task begins at step 705 in which the expert accesses the offer task which was provided by a call center system. Then, in step 709, the expert determines whether he or she wishes to, or is able to, accept the offer task.

It is determined in step 713 if the expert has accepted the offer task. If it is determined that the expert has not accepted the offer task, then the processing of an offer task is completed. It should be appreciated, however, that in some systems, the expert may be allowed to propose alternative times for a callback if his or her reason for not accepting the offer task is an inability to accept a callback at times requested by a customer.

Alternatively, if it is determined in step 713 that the expert has accepted the offer task, then a system associated with the expert is used by the expert in step 717 to create an acceptance of the offer task. The acceptance may include, but is not limited to, at least one time that the expert is available to participate in a callback. Once the acceptance is created, the acceptance is provided to the call center system in step 721.

A determination is made in step 725 as to whether a retraction of the offer task has been received by the expert. It should be appreciated that the retraction of the offer task may be received if another expert has accepted the offer task and, hence, the acceptance provided in step 721 has essentially been rejected. If a retraction of the offer task is received, then the processing of an offer task is completed.

If no retraction of the offer task is received in step 725, then it is determined in step 729 whether an acknowledgement of the acceptance has been received from the call center system. If no acknowledgement has been received, process flow returns to step 725 in which it is determined if the offer task has been retracted. Alternatively, if an acknowledgement of the acceptance is received, then it is determine if a provisional acceptance is indicated. Unless a representative from every set of experts to whom the offer task as been sent has accepted the offer task, then the acceptance of the expert is provisional because a callback may not actually be scheduled until each area of expertise may be collectively addressed.

If a provisional acceptance is not indicated, then the indication is that a callback between the expert and the customer may be successfully scheduled. Accordingly, the scheduled callback is added to the expert's calendar using a calendaring application in step 733. The call center system may add the callback to the expert's calendar, or the expert may add the callback to his or her own calendar. Once the scheduled callback is added to the expert's calendar, the processing of an offer task is completed.

Alternatively, if a provisional acceptance is indicated in step 737, then the callback may be tentatively scheduled in the expert's calendar. It should be appreciated that the expert may tentatively add the scheduled callback to his or her own calendar, or the call center system may tentatively add the scheduled callback to the expert's calendar. Once the scheduled callback is tentatively added to the expert's calendar, the processing of an offer task is completed.

Figure 8:
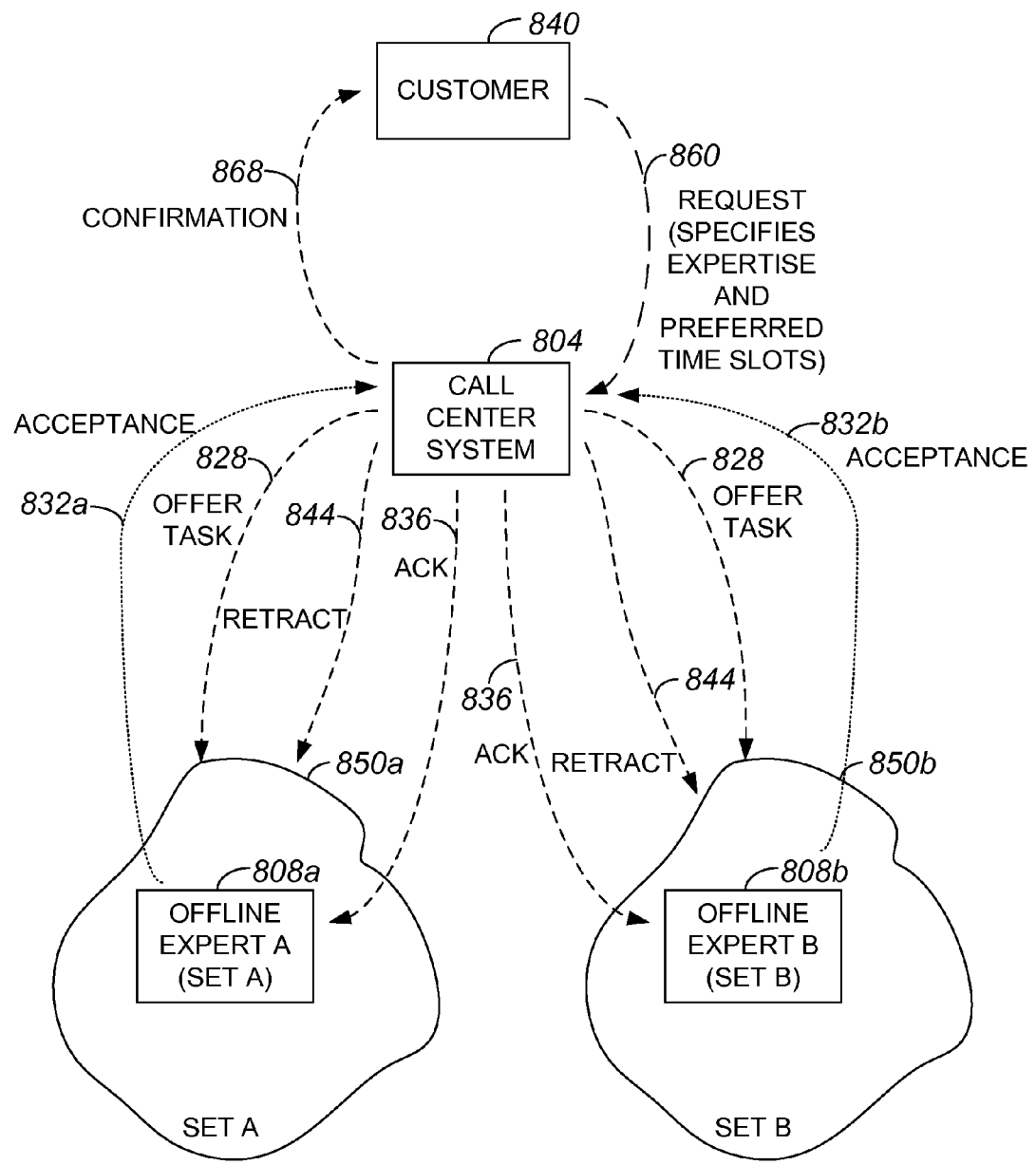
FIG. 8 is a diagrammatic representation of a flow of information between a customer, a call center system, and a plurality of offline experts in accordance with an embodiment of the present invention.

Referring next to FIG. 8, a flow of information between a customer, a call center system, and a plurality of offline experts associated with a successfully scheduled callback will be described in accordance with an embodiment of the present invention. A customer 840 may call into, or otherwise contact, a call center system 804 with a request 860. The request may effectively specify at least one area of expertise that is desired by the customer, and preferred time slots which the customer would like to receive a callback.

Upon receiving request 860, call center system 804 identifies at least one set of offline experts 850a, 850b with expertise that is appropriate to answer request 860 of customer 840. In the described embodiment, call center system 804 identifies two sets 850a, 850b, although it should be appreciated that the number of sets 850a, 850b may vary widely.

Call center system 804 generates at least one offer task 828 which is provided to substantially all experts in sets 850a, 850b. In the described embodiment, a single offer task 828 is provided to substantially all experts in sets 850a, 850b. It should be appreciated, however, that separate offer tasks may instead be generated for each set 850a, 850b. Experts in sets 850a, 850b may accept offer task 828 when they become aware of, e.g., access, offer task 828. As shown, expert 808a of set 850a and expert 808b of set 850b accept offer task 828. Hence, expert 808a sends an acceptance 832a to call center system 804, and expert 808b sends an acceptance 832b to call center system 804.

Upon receiving acceptances 832a, 832b, call center system 804 may process acceptances 832a, 832b. Processing acceptances 832a, 832b may include, but is not limited to including, generating an acknowledgement 836, a retraction 844, and a confirmation 868.

Acknowledgement 836, which is sent to experts 808a, 808b, effectively confirms a time for a scheduled callback between experts 808a, 808b and customer 840 which may be facilitated by call center system 804. In one embodiment, call center system 804 may initiate the scheduled callback, e.g., by initiating a conference call between experts 808a, 808b and customer 840 at the time scheduled for the callback. Alternatively, call center system 804 may set up a conference call bridge, provide information relating to the conference call bridge to experts 808a, 808b and customer 840, and allow experts 808a, 808b and customer 840 to access the conference call bridge at the time scheduled for the callback. In some instances, some participants in a conference call associated with the callback may call into a conference bridge while others may be substantially automatically called when the conference call is scheduled. By way of example, expert 808a may call into a conference bridge while customer 840 and expert 808b are substantially automatically conferenced in without having to call the conference bridge.

Retraction 844, which is provided to all experts in sets 850a, 850b except for experts 808a, 808b, retracts offer task 828. Experts who receive retraction 844 become unable to accept offer task 828.

Confirmation 868, which is provided to customer 840, notifies customer 840 that a callback associated with request 860 has been scheduled. Confirmation 868 may identify experts 808a, 808b as well as the time at which the scheduled callback will occur. In one embodiment, confirmation 868 may include information relating to a conference bridge which may be used by customer 840 to participate in the schedule callback, although call center system 804 may instead initiate the scheduled callback between customer 840 and experts 808a, 808b.

Although only a few embodiments of the present invention have been described, it should be understood that the present invention may be embodied in many other specific forms without departing from the spirit or the scope of the present invention. By way of example, a determination of whether an offer task has been accepted may occur either substantially in real-time upon receiving an acceptance message from an expert, or when the offer task expires. Determining whether an offer task has been accepted approximately when the offer task expires enables all acceptances to be processed at substantially the same time, and substantially when no more acceptances will be received.

When an offline expert or knowledge worker processes a received offer task, the offline expert may either accept the offer task or reject the offer task. In general, if the offline expert does not send or otherwise transmit a response to the offer task, the offline expert is assumed to not accept the offer task. However, in some cases, an offline expert may explicitly reject an offer task. For example, an offline expert may send a rejection to a call center system which indicates that he or she is not interested in the offer task. If offline experts all send rejections when they are not interested in providing assistance in relation to the offer task, the call center system may be able to more efficiently inform a customer that his or her request for a callback has not been fulfilled. That is, if all offline experts in a set send rejections of an offer task to the call center system in a relatively expedient manner, the call center system may notify a customer of an inability to fulfill a callback request substantially when the rejections have been received from all the experts in the set, instead of waiting until the offer task expires.

In one embodiment, if none of the time slots proposed in an offer task is acceptable to any offline experts to whom the offer task was sent, a call center system may send out a request to those offline experts to solicit time slots during which the offline experts are available. Alternatively, the offline experts may be provided with the ability to conditionally or provisionally accept offer tasks by specifying alternative time slots during which the offline experts are available. That is, counter proposals may be provided by an expert who is interested in accepting an offer task, but is unable to do so at times requested by a customer. For example, if one expert makes a counter proposal and no other expert accepts an offer task, a call center system may contact a customer to allow the customer to determine whether to accept the counter proposal. However, if one expert makes a counter proposal but another expert accepts the offer task, the counter proposal may effectively be ignored.

A call center system may access calendars of offline experts when it is attempting to define a set of suitable experts to whom to send an offer task. By accessing the calendars, the call center system may decide to provide an offer task only to those experts whose calendars indicate that they are available during time slots specified by a customer who desires assistance.

When an offline expert accepts an offer task, a call center system typically provides the offline expert with an acknowledgement which indicates that the offline expert has successfully accepted the offer task and that a callback has been scheduled. It should be appreciated that when the offer task is associated with more than one set of experts, the call center system may withhold providing an acknowledgement until a representative from each set of experts has accepted the offer task. If a representative from each set of experts has not accepted the offer task before the offer task effectively times out, then instead of sending the acknowledgement to a representative of one set of experts who has already accepted the offer task, the call center system may send an indication that a callback has not been successfully scheduled.

An offline expert has been described as an expert who is not currently logged into a call center system. It should be appreciated, however, that an offline expert is not limited to being an expert who is not currently logged into a call center system. For example, an expert who is logged into the call center system may effectively be considered to be offline if the call center system is unable to contact the expert.

When a customer calls into a call center, and there is no online or on-call expert with the exact expertise the customer needs, the customer may be given an option of whether to accept assistant from a knowledge worker without the exact expertise being sought, or accept a callback at a later time, e.g., a time of the customer's choosing, from an expert with the exact expertise needed. In other words, a customer may elect substantially immediate assistance from a knowledge worker without the exact expertise he or she seeks, rather than await a scheduled callback from a more suitable expert.

While a situation in which a callback is substantially initiated by a call center system has been described, it should be understood that a customer may instead initiate a callback. A contact, e.g., a callback, may be initiated by either a call center system or a customer. That is, a customer who has a callback scheduled with at least one expert associated with a call center may call the call center at a scheduled time, and then be conferenced with a team of experts who have the expertise needed to provide the customer with his or her desired service. The customer may be expected to call into a call center at a proper time, rather than wait for the call center to call him or her. Hence, a callback is not limited to being initiated by a call center system and may, instead, be initiated by a customer. In other words, although the present invention has generally been described with respect to scenarios in which a call center system initiates a callback with a customer, the present invention is also applicable to a scenario in which a customer is provided with a number to call and a time to call in order to participate in a callback.

The steps associated with the methods of the present invention may vary widely. Steps may be added, removed, altered, combined, and reordered without departing from the spirit of the scope of the present invention. By way of example, if an offer task is arranged to be sent to two or more different groups of experts, a call center system may determine if there are any experts who are members of more than one group of experts. If there are experts who are members of more than one set of experts, the customer call system may ensure that the offer task is sent substantially only once to those experts. In one embodiment, the customer call system may assign a relatively high priority to an expert who is a member of more than one set of experts to whom an offer task is sent, as it may be preferred to establish a callback with as few experts as possible. Therefore, the present examples are to be considered as illustrative and not restrictive, and the invention is not to be limited to the details given herein, but may be modified within the scope of the appended claims.

What is claimed is:

1. A method comprising:
   obtaining a request, the request being obtained by a call center system from a customer during a call from the customer to the call center system;
   identifying a first set of experts using the call center system, the first set of experts including at least a first expert, the first set of experts being suitable for processing the request, wherein the at least first expert is offline with respect to the call center system, wherein identifying the first set of experts includes identifying a preferred communication modality for the first expert from a plurality of communication modalities;
   creating an offer task, the offer task being arranged to identify the request and to initiate the scheduling of a callback to address the request; and
   providing the offer task to the first set of experts using the call center system, wherein providing the offer task to the first set of experts includes providing the offer task to the first expert using the preferred communication modality.

2. The method of claim 1 further including:
   obtaining an acceptance of the offer task from the first expert; and
   retracting the offer task from all included in the first set of experts except for the first expert.

3. The method of claim 1 wherein providing the offer task to the first expert includes transmitting the offer task to the first expert using a communications interface of the call center system.

4. A method comprising:
   obtaining a request, the request being obtained by a call center system from a customer during a call from the customer to the call center system;
   identifying a first set of experts suitable for processing the request using the call center system, the first set of experts including at least a first expert suitable for processing the request and a second expert suitable for processing the request, wherein the at least first expert is offline with respect to the call center system;
   creating an offer task, the offer task being arranged to identify the request and to initiate the scheduling of a callback to address the request;
   providing the offer task to the first set of experts;
   obtaining a first acceptance of the offer task from the first expert;
   obtaining a second acceptance of the offer task from the second expert;
   determining whether to accept the first acceptance or the second acceptance;
   accepting the first acceptance;
   scheduling a contact between the customer and the first expert after accepting the first acceptance; and
   retracting the offer task from the second expert.

5. A method comprising:
obtaining a request, the request being obtained by a call center system from a customer during a call from the customer to the call center system;
identifying a first set of experts using the call center system, the first set of experts including at least a first expert, the first set of experts being suitable for processing the request, wherein the at least first expert is offline with respect to the call center system and wherein the first set of experts has a first area of expertise;
creating an offer task, the offer task being arranged to identify the request and to initiate the scheduling of a callback to address the request;
providing the offer task to the first set of experts;
identifying a second set of experts, the second set of experts including at least a second expert suitable for processing the request, the second set of experts having a second area of expertise, wherein the second expert is offline with respect to the call center system; and
providing the offer task to the second set of experts.

6. The method of claim 5 further including:
obtaining a first acceptance of the offer task from the first expert;
obtaining a second acceptance of the offer task from the second expert; and
scheduling a contact between the customer, the first expert, and the second expert after obtaining the first acceptance and the second acceptance.

7. Logic encoded in one or more non-transitory computer-readable media for execution and when executed operable to:
obtain a request, the request being obtained by a call center system from a customer during a call from the customer to the call center system;
identify a first set of experts using the call center system, the first set of experts including at least a first expert, the first set of experts being suitable for processing the request, wherein the at least first expert is offline with respect to the call center system;
create an offer task, the offer task being arranged to identify the request and to initiate the scheduling of a contact to address the request; and
provide the offer task to the first set of experts, wherein the logic operable to identify the first set of experts includes logic operable to identify a preferred communication modality from a plurality of communication modalities for the first expert, and wherein the logic operable to provide the offer task to the first set of experts is further operable to provide the offer task to the first expert using the preferred communication modality.

8. Logic encoded in one or more non-transitory computer-readable media for execution and when executed operable to:
obtain a request, the request being obtained by a call center system from a customer during a call from the customer to the call center system;
identify a first set of experts suitable for processing the request using the call center system, the first set of experts including at least a first expert suitable for processing the request and a second expert suitable for processing the request, wherein the at least first expert is offline with respect to the call center system;
create an offer task, the offer task being arranged to identify the request and to initiate the scheduling of a contact to address the request;
provide the offer task to the first set of experts, wherein the logic operable to identify the first set of experts includes logic operable to identify a preferred communication modality from a plurality of communication modalities for the first expert, and wherein the logic operable to provide the offer task to the first set of experts is further operable to provide the offer task to the first expert using the preferred communication modality;
obtain a first acceptance of the offer task from the first expert;
obtain a second acceptance of the offer task from the second expert;
determine whether to accept the first acceptance or the second acceptance;
accept the first acceptance;
schedule a contact between the customer and the first expert after accepting the first acceptance; and
retract the offer task from the second expert.

9. Logic encoded in one or more non-transitory computer-readable media for execution and when executed operable to:
obtain a request, the request being obtained by a call center system from a customer during a call from the customer to the call center system;
identify a first set of experts suitable for processing the request using the call center system, the first set of experts including at least a first expert suitable for processing the request, wherein the at least first expert is offline with respect to the call center system and wherein the first set of experts has a first area of expertise;
identify a second set of experts, the second set of experts including at least a second expert suitable for processing the request, the second set of experts having a second area of expertise, wherein the second expert is offline with respect to the call center system;
create an offer task, the offer task being arranged to identify the request and to initiate the scheduling of a contact to address the request;
provide the offer task to the first set of experts, wherein the logic operable to identify the first set of experts includes logic operable to identify a preferred communication modality from a plurality of communication modalities for the first expert, and wherein the logic operable to provide the offer task to the first set of experts is further operable to provide the offer task to the first expert using the preferred communication modality; and
provide the offer task to the second set of experts.

10. The logic of claim 9 further operable to:
obtain a first acceptance of the offer task from the first expert;
obtain a second acceptance of the offer task from the second expert; and
schedule a contact between the customer, the first expert, and the second expert after obtaining the first acceptance and the second acceptance.

* * * * *